(No Model.)

P. M. CROCKER.
NUT LOCK.

No. 312,555. Patented Feb. 17, 1885.

WITNESSES:
Fred. G. Dieterich,
Arthur L. Morsell

Pitser M. Crocker
INVENTOR.

By Louis Bagger & Co.
ATTORNEYS.

UNITED STATES PATENT OFFICE.

PITSER MILLER CROCKER, OF McNAIRY, TENNESSEE, ASSIGNOR OF ONE-HALF TO JOHN CROCKER, OF GARLAND, ARKANSAS.

NUT-LOCK.

SPECIFICATION forming part of Letters Patent No. 312,555, dated February 17, 1885.

Application filed April 11, 1884. (No model.)

*To all whom it may concern:*

Be it known that I, PITSER M. CROCKER, a citizen of the United States, and a resident of McNairy, in the county of McNairy and State of Tennessee, have invented certain new and useful Improvements in Nut-Locks; and I do hereby declare that the following is a full, clear, and exact description of the invention, which will enable others skilled in the art to which it appertains to make and use the same, reference being had to the accompanying drawings, which form a part of this specification, and in which—

Figure 1:
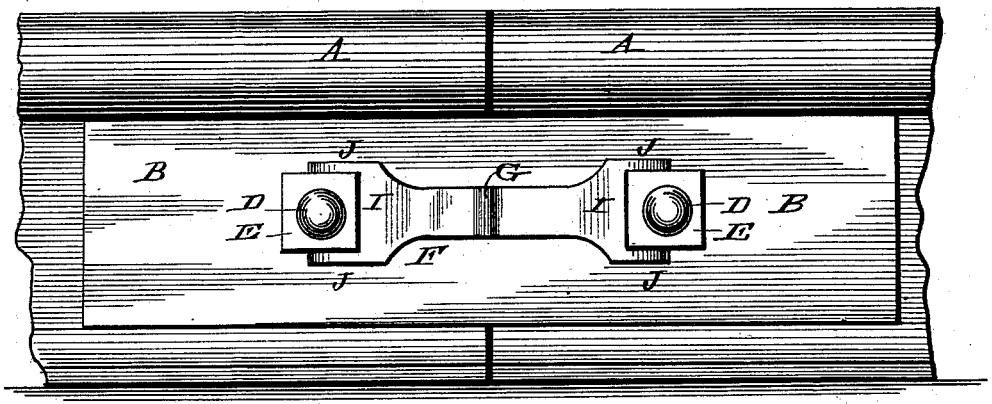
Figure 2:
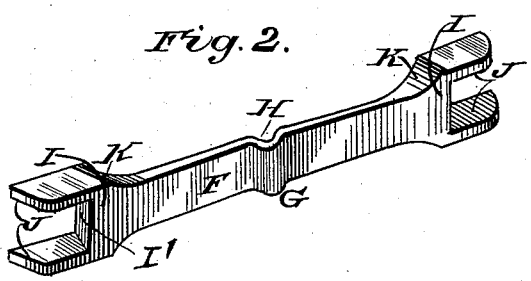
Figure 3:
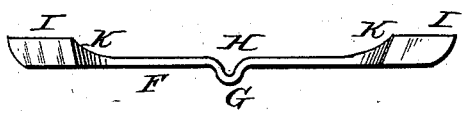

Figure 1 is a side view of a rail-joint, showing my improved nut-lock in position. Fig. 2 is a perspective view of the nut-lock removed, and Fig. 3 is a top view of the same.

Similar letters of reference indicate corresponding parts in all the figures.

My invention has relation to nut-locks which are adapted more especially for the bolts and fish-plates used on rail-joints; and it consists in the detailed construction of the device, which will be hereinafter more fully described and claimed.

In the accompanying drawings, the letters A denote the ends of two railway-rails, and B one of the fish-plates. The bolts are shown at D and the nuts at E.

My improved locking device consists of a flat bar, F, of suitable metal, the middle part of which is bent to form a rib, G, recessed on its under side, as shown at H. At opposite ends of the bar it is enlarged to form heads I, which are provided with parallel arms or projections J, adapted to fit over the upper and under sides of the nuts E, as will appear more clearly by reference to Fig. 1 of the drawings. The bar at its opposite ends where it forms the heads or enlargements I is made of gradually-increasing thickness, as shown at K, for the purpose of affording a better support for the flanges or projections J. If the bar were made of the same thickness throughout its entire length, its middle part would be too thick and heavy to permit it to be sprung into its proper position upon the fish-plate.

To place the device upon the nuts so as to fasten or lock the same, the nuts are first turned square, as shown in the drawings, so as to fit into the heads I of the bar. One of said heads is then placed over its appropriate nut, and by pressing or pushing on the other or free end of the device against the nut sidewise the bulge formed by the transverse rib will yield or give a little, so as to permit the head at the other end of the bar to be sprung over its appropriate nut. The spring or tension of the bar, owing to the bent part H G, will be sufficient to hold it in its place after it has been placed in position upon the nuts.

I am well aware that nut-locks have been made before consisting of a notched or slotted bar adapted to hold the nuts with its slots or notches; neither do I claim such construction, broadly; but it will be seen that the thinness of the middle part of my bar F, together with its transverse bend G, permits the bar to be readily bent so as to be sprung into its proper place upon the fish-plate between the bolts and nuts, where it will be held without any other means of fastening. The inner sides, I', of the recesses in the ends of the locking-bar are beveled or sloping inward, and aid by their bevel to slip the other end of the bar upon its nut after one end has been placed over the other nut, the inclined or beveled side sliding upon the edge of the nut.

Having thus described my invention, I claim and desire to secure by Letters Patent of the United States—

1. As an improved article of manufacture, the device for locking nuts in pairs herein shown and described, consisting of the flat bar F, having central transverse rib, G, and provided at opposite ends with the enlarged heads I, having parallel projecting arms J J, substantially as and for the purpose shown and specified.

2. As an improved article of manufacture, the device for locking nuts in pairs, consisting of the flat bar F, having central transverse ridge or bulge, G H, and provided at opposite ends with the enlarged heads I, formed with recesses having inner beveled sides, I', and parallel projecting arms J J, as and for the purpose shown and set forth.

In testimony that I claim the foregoing as my own I have hereunto affixed my signature in presence of two witnesses.

PITSER MILLER CROCKER.

Witnesses:
G. M. NOLAN,
G. W. GARRETT.